United States Patent

Braband et al.

[11] Patent Number: 6,033,577
[45] Date of Patent: Mar. 7, 2000

[54] COORDINATION OF LIQUID-SOLID SEPARATORS AND FLUID TANKS

[75] Inventors: William E. Braband, Cranberry, Pa.; Steven Chenault, Wellsville, Ohio; William Inkenhaus, Pittsburgh; James Vogel, Beaver, both of Pa.

[73] Assignee: Dravo Lime Company, Pittsburgh, Pa.

[21] Appl. No.: 09/080,655

[22] Filed: May 18, 1998

[51] Int. Cl.[7] .......................... B01D 21/26; B01D 17/038
[52] U.S. Cl. .......................... 210/741; 210/744; 210/787
[58] Field of Search .................................. 210/741, 744, 210/787, 805, 806, 512.2, 739

[56] References Cited

U.S. PATENT DOCUMENTS

| | | | |
|---|---|---|---|
| 4,042,025 | 8/1977 | Skinner et al. | 166/250 |
| 4,482,461 | 11/1984 | Hindman et al. | 210/741 |
| 4,659,461 | 4/1987 | Carroll | 210/512.2 |
| 4,783,272 | 11/1988 | Patterson | 210/787 |
| 4,822,484 | 4/1989 | Prendergast et al. | 210/96.1 |
| 4,844,812 | 7/1989 | Haynes et al. | 210/741 |
| 5,039,499 | 8/1991 | Stowe, Jr. | 423/242 |
| 5,084,255 | 1/1992 | College et al. | 423/242 |
| 5,507,955 | 4/1996 | Webb | 210/741 |
| 5,620,606 | 4/1997 | McBrayer, Jr. et al. | 210/696 |

*Primary Examiner*—David A. Simmons
*Assistant Examiner*—Frank M. Lawrence
*Attorney, Agent, or Firm*—Armstrong, Westerman Hattori, McLeland & Naughton

[57] ABSTRACT

This invention relates to a control method and apparatus for the coordination of a number of automated liquid-solid separators with an in-line pump between a fluid feed tank and liquid-solid separators. The control method and apparatus develops on-line control signals for the process control of predetermined manipulated process variables. The present invention provides excellent separation control for fluid tanks in which fluid inlet rates vary.

5 Claims, 5 Drawing Sheets

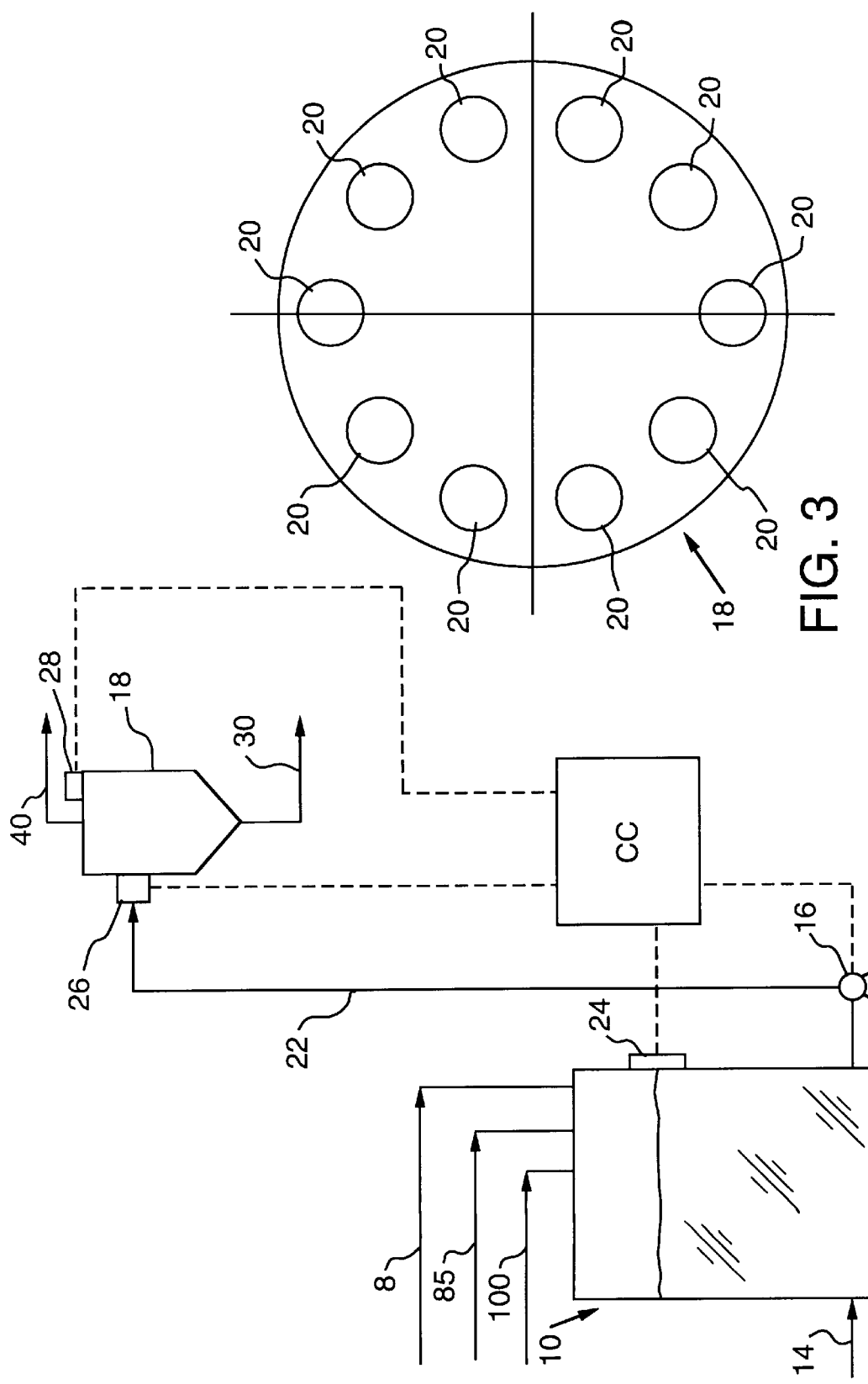

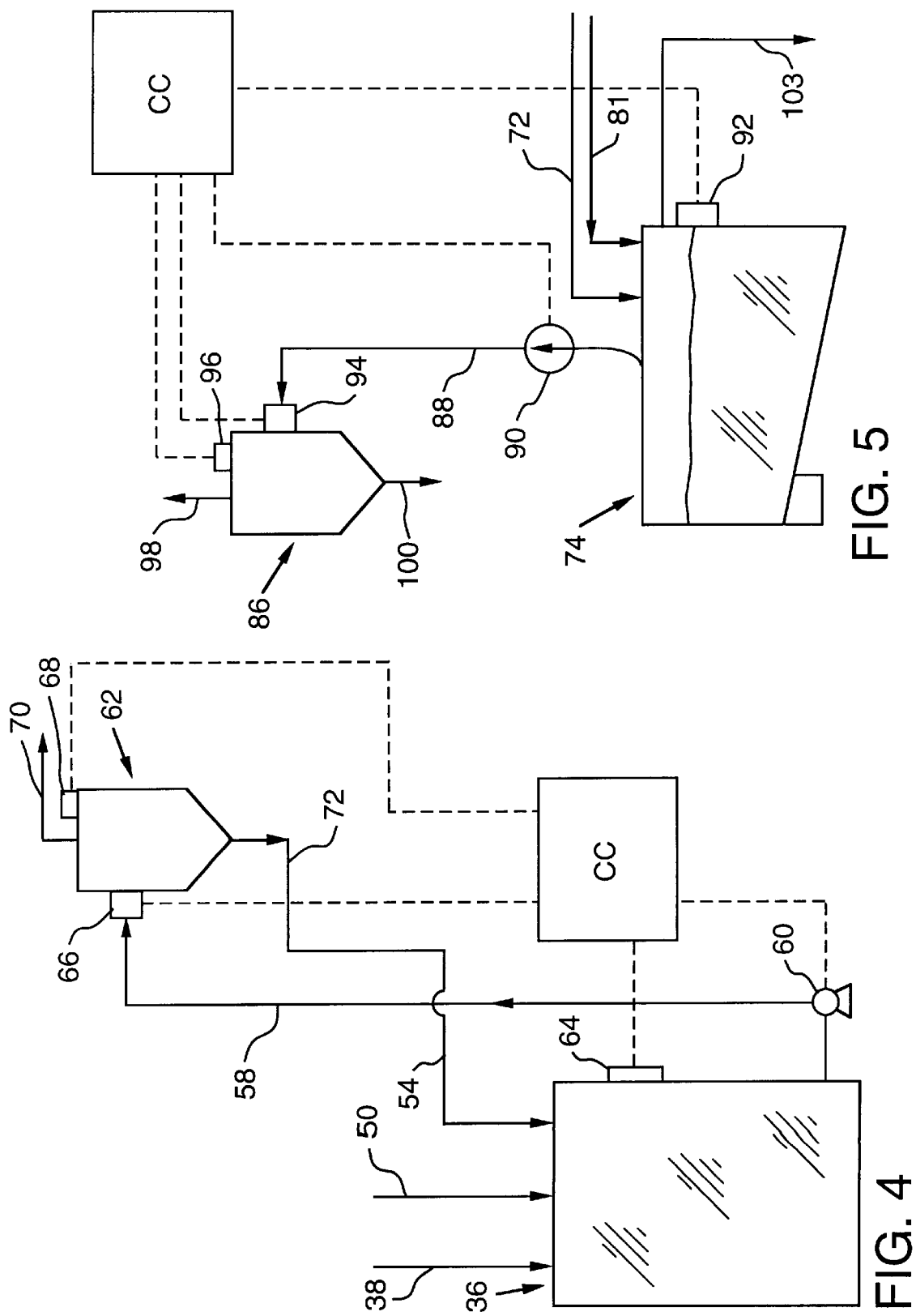

COORDINATION OF LIQUID-SOLID SEPARATORS AND FLUID TANKS

FIELD OF THE INVENTION

The present invention relates generally to an on-line process control method and apparatus and more specifically to an on-line control method and apparatus for the controlling of liquid-solid separators connected to fluid tanks.

BACKGROUND OF THE INVENTION

The present invention applies to liquid tanks connected to liquid-solid separators such as centrifugal separators. While not limited to industrial and chemical engineering uses, the present invention is typically applied in these areas. The present invention is designed to overcome problems associated generally with operating liquid-solid separators connected to liquid tanks and more specifically with operating separators and tanks as components of a larger system.

For example, one application of the present invention is the method and apparatus of process control of liquid-solid separators connected to fluid tanks as part of the system for treating spent scrubbing medium from flue gas desulfurization wet scrubbers. In this process, sulfur dioxide-containing flue gas may be scrubbed with a slurry containing magnesium scrubbing components. The scrubbing takes place, for example, in an absorption tower in which the gas flow is typically countercurrent to and in intimate contact with a scrubbing solution. The solution may flow over packing or trays, or be sprayed into an open section of the tower.

Spent scrubbing fluid in a desulfurization wet scrubber is largely comprised of sulfites. This scrubbing fluid needs to be treated to convert sulfites into readily usable or disposable products such as magnesium hydroxide and calcium sulfate. To this end, the treatment process is started by removing a portion of the scrubbing fluid to an oxidizer. In the oxidizer the aqueous scrubbing fluid, comprised mainly of sulfites, is contacted at least with an oxygen-containing gas, such as air, which is typically sparged through the unit and removed from the top after contact with the fluid. The sulfites are converted to sulfates. This treated aqueous scrubbing fluid contains dissolved sulfates and suspended sulfates as well as other minor suspended solids. The fluid is then discharged to a first group, or bank, of liquid-solid separators.

The liquid-solid separator uses centrifugal force to separate the smaller low density particles from the larger high density particles. The oxidized medium is separated into an overflow of sulfates containing few suspended solids and an underflow with a heavier concentration of suspended solids. The overflow is clarified and passed to a regeneration tank.

In the regeneration tank, the oxidized and separated overflow is contacted with an aqueous slurry of magnesium-containing lime. The magnesium-containing lime slurry charged to the regeneration tank is formed in a slaker by the addition of magnesium-containing lime and water thereto. In the regeneration tank the sulfates are reacted with calcium hydroxide, which results in the precipitation of calcium sulfate and formation of magnesium hydroxide.

The regenerated aqueous medium is passed from the regeneration tank, by means of a pump, to a second bank of liquid-solid separators. The regenerated medium is separated into an aqueous overflow of mostly magnesium hydroxide and a underflow with a heavy concentration of calcium sulfate. The underflow is discharged into a dilution tank.

The underflow of calcium sulfate may be further contacted with additional solution in the dilution tank before the resulting aqueous solution is discharged to a third bank of liquid-solid separators wherein the solution is once again separated into an overflow and an underflow. The captured magnesium hydroxide in the overflow can be recycled back to the absorber tower and calcium sulfate in the underflow solution can be recycled back to the oxidizer.

Such a scrubbing process and scrubbing medium treatment system is described in U.S. Pat. Nos. 5,039,499 and 5,084,255, the contents of which are incorporated herein by reference and both patents are assigned to the assignee of the present invention.

In the above system, for example, the present invention comprises an on-line control method and apparatus for the controlling and coordination of the liquid tanks and liquid-solid separators. The coordination is necessary to help optimize the use of liquid-solid separators, optimize feed tank levels to avoid tank overflow, to maintain a continuous fluid flow and to help eliminate fluid line back pressure. One or more oxidizing tanks, regeneration tanks, and further dilution tanks may each be connected to a bank of liquid-solid separators.

OBJECTS OF THE INVENTION

It is a principal object of the present invention to provide an on-line control method and apparatus for the coordination of a number of automated liquid-solid separators with fluid feed tanks connected with an in-line pump. Once again, the method and apparatus of the present invention are applicable to fluid tanks connected to liquid-solid separators, but the present invention will be illustrated in the context of a system for the desulfurization of sulfur dioxide containing gas from a wet scrubbing unit.

It is another object of the present invention to provide a control method and apparatus for the simultaneous and instantaneous control of the level of a fluid in a fluid feed tank connected to a group or bank of liquid-solid separators, the fluid pressure at an inlet of a bank of liquid-solid separators and a number of automated liquid-solid separators in operation.

It is yet another object of the present invention to provide a control method and apparatus to help eliminate back pressure in a line between a liquid-solid separator or bank of liquid-solid separators and a fluid tank.

It is still another object of the present invention to provide a control method and apparatus which delivers a continuous flow of liquid from a fluid feed tank to a liquid-solid separator or bank of liquid-solid separators.

It is a further object of the present invention to provide an improved process for flue gas desulfurization.

Other objects, features and advantages of the present invention will become apparent from the following detailed description taken in conjunction with the accompanying drawings.

SUMMARY OF THE INVENTION

In accordance with one embodiment of the present invention a control method and apparatus for the coordination of a number of automated liquid-solid separators with an in-line pump between a fluid feed tank and liquid-solid separators. The control method and apparatus develops on-line control signals for the process control of predetermined manipulated process variables.

The method of the present invention involves coordination of elements in a system in response to a fluid outside a predetermined level limit in a fluid tank. The method involves obtaining data from a sensor in a fluid feed tank, computing a value based on this data, and generating a first command signal to respond to the rising or falling of the fluid level in the fluid feed tank beyond predetermined setpoint parameters. The response command signal is directed to a bank of automated liquid-solid separators connected to the fluid feed tank. The number of separators in operation determines the volume of fluid that can be processed and correspondingly the volume of fluid that can be discharged from the fluid feed tank.

A change in the number of separators in operation changes the pressure of the fluid in the line between the fluid feed tank and liquid-solid separators. The control method of the present invention obtains data from a sensor about the change in fluid pressure, computes a value based on this data, and generates a second command signal to respond to increased or decreased pressure in the fluid feed line. The command signal is directed to increasing or decreasing the speed of the pump or opening or closing a control valve. The pump speed or control valve position will change in order to better maintain a constant line fluid pressure.

The apparatus for carrying out the method of the present invention comprises fluid sensors on a fluid feed tank, an exit line containing an in-line pump that extends from the fluid feed tank to a bank of separators or optionally an in-line control valve on a recirculation line connected to a control apparatus, fluid pressure sensors on the bank of separators, a liquid-solid separator controller such as an automated valve and a coordination controller.

BRIEF DESCRIPTION OF THE DRAWINGS

FIG. 2 is a block diagram and functional schematic representation of the details of the polishing oxidizer tank of FIG. 1 connected to a bank of liquid-solid separators which includes a control apparatus for the coordination of the level of fluid in the oxidizer tank, fluid pressure at the inlet of a bank of liquid-solid separators, speed of an in-line pump and a number of automated liquid-solid separators in operation;

FIG. 3 is a block diagram and functional schematic representation of the details of the bank of hydroclones of FIG. 1;

FIG. 4 is a block diagram and functional schematic representation of the details of the regeneration tank of FIG. 1 connected to a bank of liquid-solid separators;

FIG. 5 is a block diagram and functional schematic representation of the details of the dilution tank of FIG. 1 connected to a bank of liquid-solid separators;

DETAILED DESCRIPTION OF THE INVENTION

Figure 1:
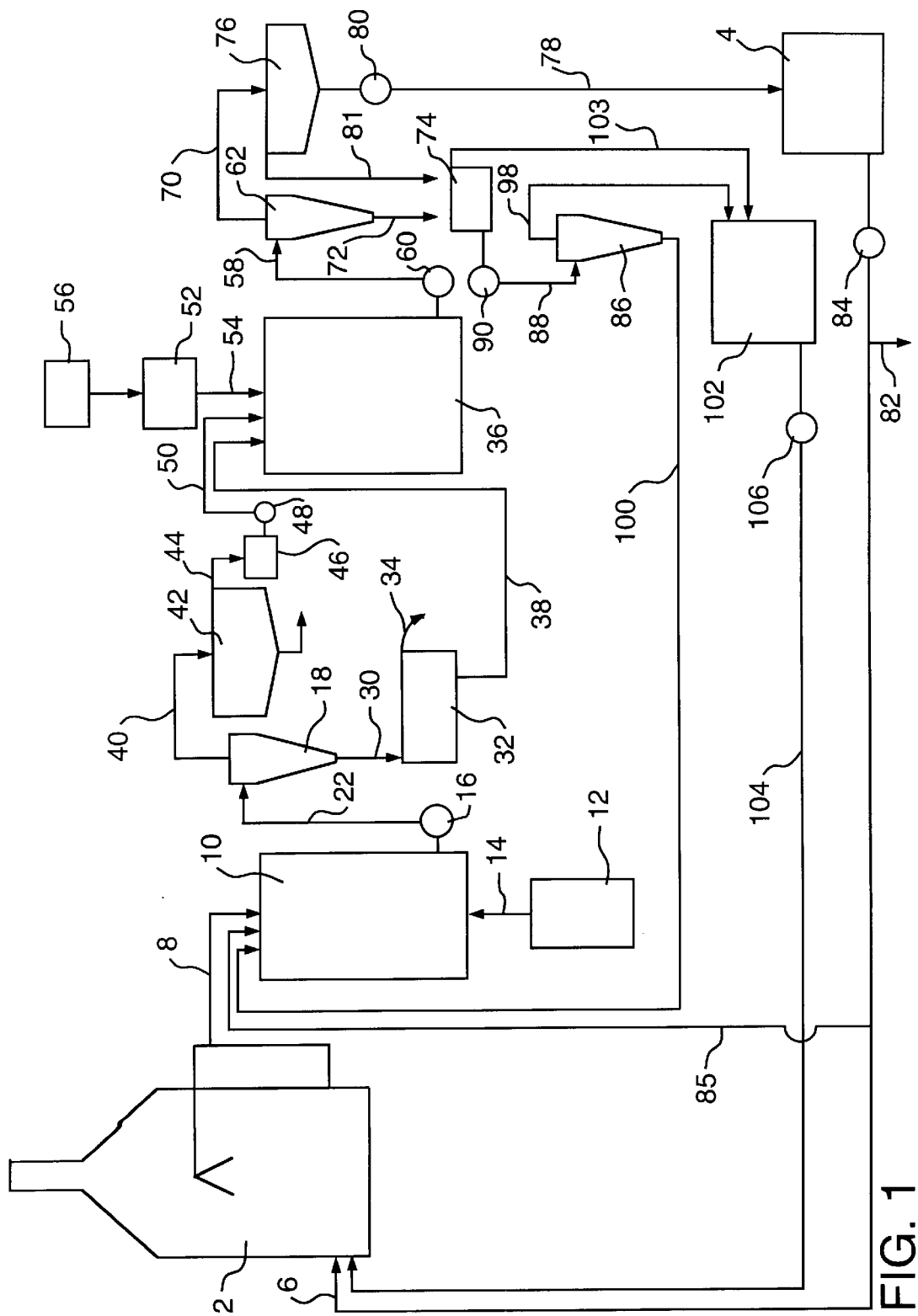
FIG. 1 is a process schematic and flow diagram representation of the treatment system for spent medium from a desulfurization wet scrubber.

There is shown in FIG. 1 a flow diagram for the treatment of spent scrubbing medium from a desulfurization wet scrubber. The method and apparatus for the simultaneous control of the number of automated liquid-solid separators in service and the pump speed are integrated into this embodiment and detailed in the accompanying illustrations.

Desulfurization of flue gas starts with contact with a scrubbing medium in wet scrubber 2. Wet scrubber 2 is charged with an aqueous solution containing magnesium hydroxide ions from a magnesium hydroxide tank 4 by line 6. Gas to be scrubbed is charged to, and after contact with the scrubbing medium, discharged from the wet scrubber 2. A portion of spent scrubbing medium exits wet scrubber 2 through line 8 and enters an oxidizer tank 10. In order to oxidize the medium in oxidizer tank 10, air is introduced into oxidizer tank 10 from air compressor 12 through line 14. In the oxidation process, sulfites and bisulfites of magnesium are converted to sulfates in soluble form.

The oxidized medium from oxidizer tank 10 is then pumped by an in-line pump 16 to a first liquid-solid separators bank 18 such as hydroclone liquid-solid centrifugal separators. To achieve maximum efficiency in the operation of liquid-solid separators bank 18 there exists a need for the efficient coordination of liquid-solid separators bank 18, the feed source, oxidizer tank 10 and in-line pump 16.

Difficulties exist with the coordination of a fluid feed tank and a liquid-solid separator. Part of the problem is due to the fact that fluid flow through the system is not steady state. Fluid movement depends on extraction of effluent from scrubber 2, fluid residence time in treatment tanks and the operation of in-line pumps in the system. Since fluid flow is not steady state and the liquid-solid separators in the system typically operate at a constant rate, then they can contribute inefficiency to the overall system. If the solid separators could operate in response to the fluctuations in fluid flow in the system then fluid could be processed more efficiently and the use of the separators could be optimized. The present invention solves this problem.

FIG. 2 shows oxidizer tank 10 connected to liquid-solid separators bank 18 of FIG. 1 by feed line 22. In this embodiment, liquid-solid separator 18 is a bank of individual hydroclones 20. One possible configuration of the bank of individual hydroclones 20 is illustrated in FIG. 3. Individual hydroclones 20 are arranged in a configuration to allow for efficient access of fluid entering liquid-solid separators bank 18.

Besides the oxidizer tank 10, liquid-solid separators bank 18, feed line 22, and in-line pump 16, the apparatus includes fluid level sensors 24 located on oxidizer tank 10, fluid pressure sensors 26 located on liquid-solid separators bank 18, a liquid-solid separator controller 28 located on liquid-solid separators bank 18 and a central control means or coordination controller CC.

Coordination controller CC may be for example, a pneumatic, electric, digital, programmable logic controller, or other controller system known in the art which is programmable and preset so that it operates in response to information received from the fluid level sensors 24, pressure sensors 26, in-line pump 16 and liquid-solid separator controller 28. The fluid level sensors 24, pressure sensors 26, liquid-solid separator controller 28 and in-line pump 16 are all operably associated with coordination controller CC to coordinate operation of discharge from oxidizer tank 10, in-line pump 16 and first bank of liquid-solid separators 18. The control system can send and receive signals that may be electronic, digital or pneumatic.

Fluid level sensors 24 may take the form of electronic probes that can sense, measure, compute and report actual fluid levels and changes in fluid levels in a fluid feed tank. They may compute fluid level directly or compute fluid level indirectly through volumetric analysis. In this embodiment fluid level sensors 24 take the form of electronic sensor probes.

Fluid inlet pressure sensors 26 may take the form of electronic sensors that sense, measure, compute and report actual fluid pressure and changes in fluid pressure in the feed line 22 directly or indirectly. In the present embodiment the fluid inlet pressure sensors use PLC ladder logic to control and report inlet hydroclone pressure.

Liquid-solid separator controller 28, such as an automated valve, located on bank of liquid-solid separators 18 effectuates the turning on and turning off of individual liquid-solid separators in response to information from coordination controller CC.

In some instances it may be desirable to provide additional information to coordination controller CC. For example, information relating to the flow rate may be provided by means of flow indicators. Such flow indicators may be in the form of orifice plates or turbine meters, by way of example. Also it may be desirable to provide information like the overflow to underflow volume ratio, density ratio, flow rate ratio to coordination controller CC.

The above mentioned apparatus is a synergistic combination of elements that perform a coordinated procedure designed to help optimize the operation of the liquid-solid separators used in the desulfurization treatment system.

At system start-up, a predetermined number of hydroclones 20 are placed in service by the opening of inlet valves (not shown). The fluid level in the oxidizer tank 10 is initially established by upstream process parameters. Liquid-solid separator feed pump 16 is started and the inlet pressure at first liquid-solid separator bank 18 is established. Fluid flow to the liquid-solid separator bank 18 is allowed to achieve equilibrium. A steady state pump speed or revolutions per minute (rpm) will be achieved so that desired liquid-solid separator bank 18 inlet pressure can be achieved and maintained.

After the system has achieved steady state, control of in-line pump 16 is set to automatic, and an inlet pressure setpoint for the fluid entering first liquid-solid separator 18 is established. It may be established automatically after which the setpoint information is sent to coordination controller CC. Alternatively, the setpoint may be predetermined and programmed into coordination controller CC. The pressure setpoint is the desired fluid inlet pressure for first liquid-solid separators bank 18.

Similarly, a fluid level setpoint for the fluid level in oxidizer tank 10 is also established. It may be established automatically after which the setpoint information is sent to coordination controller CC. Alternatively the setpoint range may be predetermined and programmed into coordination controller CC. The setpoint range includes a high level setpoint and a low level setpoint.

Referring to FIG. 2 the control for liquid-solid separator bank 18 is set to automatic. When the fluid level in oxidizer tank 10 rises above the high level setpoint, the coordination controller CC computes and generates an output signal to liquid-solid separator controller 28 to place in service one or more automated hydroclones 20 by the opening of an inlet valve (not shown). This additional hydroclone or hydroclones 20 reduces the total fluid inlet pressure to liquid-solid separator bank 18. Coordination controller CC then receives an input signal lower than the desired pressure setpoint from sensors 26 and subsequently computes and generates an output signal to increase the revolutions per minute or speed of in-line pump 16 until the desired pressure at inlet pressure sensors 26 is achieved. As the speed of pump 16 increases so does gpm (gallons per minute) of fluid flow to liquid-solid separator bank 18. This increase in fluid flow now starts to drop the fluid level in oxidizer tank 10.

When the fluid level in oxidizer tank 10 drops below the low level setpoint, controller CC computes and generates an output signal computed from an input signal from fluid level sensors 24. The signal is sent to liquid-solid separator controller 28 which in turn generates a signal to close an automated hydroclone or hydroclones 20 in first liquid-solid separator bank 18. As a result, the fluid inlet pressure at inlet pressure sensors 26 increases. Coordination controller CC receives this pressure information and accordingly decreases the speed of pump 16 to adjust the pressure. Subsequently, the fluid level in oxidizer tank 10 rises again if fluid input is greater than fluid discharge.

When the fluid level in oxidizer tank 10 moves outside one of the fluid level setpoints, the entire process repeats itself again.

The system can operate on the basis of an infinite number of setpoints. A working example of a possible operating setpoint is setting the coordination controller CC to respond to a 2% increase or decrease above or below the high or low level fluid level setpoint for oxidizer tank 10. For example, if the fluid level in oxidizer tank 10 rises above high level setpoint by 2%, an additional hydroclone 20 will be placed in service until the fluid level falls below the low level setpoint by 2% or falls below the high level setpoint by 2% depending on the desired system operation. At that time, the additional hydroclone 20 will be taken out of service. The control method described above may occur simultaneously and instantaneously.

The aforementioned method and apparatus for coordinating fluid tanks and separators may be set to accommodate different process parameters. Operation of the automatic separators can change the composition of the separator underflow and overflow. For example if the pressure drop across the liquid-solid separator and the speed of the separator are changed the concentration of solids in the underflow can be increased. These can be used to change pressure set point parameters. Pump speed may be different if a better solids separation is desired to accommodate a different pressure drop to achieve a desired underflow concentration. Additionally the system may include fluid density sensitive pumps and separators that can accommodate fluid density changes as a result of solid separation.

In this desulfurization treatment system, first liquid-solid separator bank 18 uses centrifugal forces to separate the oxidized medium into an aqueous solution of sulfates and a solids containing effluent comprising insoluble sulfates. One advantage of using hydroclones is that by making appropriate adjustments in the hydroclone operating parameters, namely the feed rates, underflow rates and pressure drop across the hydroclone, the chemical compositions of the underflow and overflow can be controlled.

The solids containing effluent is discharged from liquid-solid separator bank 18 through underflow line 30 to a set of filters 32 (FIG. 1). Here the solids containing effluent may be dewatered. Part of the effluent will be discharged from filters 32 in solid form such as calcium sulfate, gypsum, through line 34, and part will be discharged as an aqueous solution and recycled to a regeneration tank 36 through line 38.

The aqueous solution of sulfates exits liquid-solid separator bank 18 by overflow line 40 and is fed into a thickener tank 42. After a residence time, the overflow medium from thickener tank 42 exits by line 44 and is passed to regeneration feed tank 46. Regeneration feed tank 46 is connected by in-line pump 48 to regeneration tank 36 through feed line 50. In regeneration tank 36 the soluble magnesium sulfate is reacted with calcium hydroxide, delivered to regeneration tank 36 from lime tank 52 by line 54, which results in the precipitation of calcium sulfate and magnesium hydroxide. Lime tank 52 is supplied by slaker 56.

The regenerated aqueous medium is passed from regeneration tank 36, through feed line 58, by means of in-line pump 60, to second liquid-solid separators bank 62. FIG. 4 details regeneration tank 36 and second bank of liquid-solid separator 62 of FIG. 1. In this embodiment, liquid-solid separator 62 is a bank of individual hydroclones. Regeneration tank 36 has fluid level sensors 64. Also included between regeneration tank 36 and separator 62 are fluid inlet pressure sensors 66. Liquid-solid separator bank 62 has a liquid-solid separator controller 68 for turning on and turning off individual hydroclones. Fluid level sensors 64, fluid inlet pressure sensors 66, liquid-solid separator controller 68 and in-line pump 60 are all connected to a controlling means. The controlling means is preferably coordination controller CC, the same controller used to coordinate the liquid level of oxidizer tank 10. However the controlling means may be an entirely separate controller. The coordination of the regeneration tank and liquid-solid separator bank may occur simultaneously and instantaneously.

There may be other sensors and probes in this system providing other parameter or system information to coordination controller CC which may use this additional information in computing values used to generate output signals to operate pump 60 and liquid-solid separator 62.

The coordination of regeneration tank 36 with liquid-solid separator 62 operates in the same manner as the coordination of oxidizer tank 10 and liquid-solid separator bank 18 described above. The coordination may also be made dependent on setpoint parameters derived from desired chemical compositions of overflow line 70 and underflow line 72 from liquid-solid separator 62.

Solids, mostly gypsum, are discharged from liquid-solid separator 62 through underflow line 72 into dilution tank 74, (FIG. 1), while a separated aqueous suspension of magnesium hydroxide is discharged through overflow line 70 into a lamella separator 76.

Solids from lamella separator 76 are discharged through line 78, by means of pump 80, to magnesium hydroxide tank 4. Here the excess soluble calcium components are discharged from magnesium hydroxide tank 4 through line 6 which connects to discharge line 82. Magnesium hydroxide from magnesium hydroxide tank 4 is recycled back to scrubber 2 by line 6, by means of pump 84. Magnesium hydroxide from magnesium hydroxide tank 4 is also recycled back to oxidizer tank 10 by line 85 which is connected to line 6. Liquids from lamella separator 76 are discharged into dilution tank 74 via line 81.

The aqueous solution in dilution tank 74 may be further separated by passing the solution into a third liquid-solid separators bank 86 through feed line 88 by means of in-line pump 90. FIG. 5 details dilution tank 74 and third liquid-solid separators bank 86 of FIG. 1. In this embodiment, liquid-solid separator bank 86 is a bank of individual hydroclones. Dilution tank 74 has fluid level sensors 92 located thereon. Also included between dilution tank 74 and separator 86 are fluid inlet pressure sensors 94. Liquid-solid separators bank 86 has a liquid solid separator controller 96 for turning on and turning off individual hydroclones. Fluid level sensors 92, fluid inlet pressure sensors 94, liquid-solid separator controller 96 and in-line pump 90 are all connected to a controlling means. The controlling means is preferably coordination controller CC, the same controller used to coordinate oxidizer tank 10. However the controlling means may be an entirely separate controller. Again the coordination of the fluid tank and separator bank may occur simultaneously and instantaneously.

There may be other sensors and probes in this system providing other parameter or system information to coordination controller CC which may use this additional information in computing values used to generate output signals to operate in-line pump 90 and liquid-solid separator bank 86.

The coordination of dilution tank 74 with liquid-solid separator bank 86 operates in the same manner as the coordination of oxidizer tank 10 and liquid-solid separator bank 18 described above. The coordination may also be made dependent on setpoint parameters derived from desired chemical compositions of the overflow line 98 and underflow line 100 from liquid-solid separator bank 86.

The gypsum contaminated with magnesium hydroxide solids residue from hydroclone bank 86 is recycled into oxidizer tank 10 through underflow line 100 (FIG. 1). The aqueous medium from hydroclone bank 86 is passed into to make-up tank 102 by overflow line 98. The dilution tank 74 is also directly connected to makeup tank 102 by overflow line 103. The contents of make-up tank 102 are recycled to scrubber 2 via recycle line 104 having in-line pump 106. This scrubbing medium treatment system described above is operated continuously.

FIG. 1 shows a treatment system for spent scrubbing medium from a wet scrubber having three hydroclone banks. First hydroclone bank 18 is connected to oxidizer tank 10 by line 22 and pump 16. Second hydroclone bank 62 is connected to regeneration tank 36 by line 58 and pump 60. Third hydroclone bank 86 is connected to dilution tank 74 by pump 90 and line 88.

The above system is only one embodiment which may include other operable variations. For example banks of liquid-solid separators may be connected in a series in order to increase the purity of separation in the overflow lines.

Figure 6:
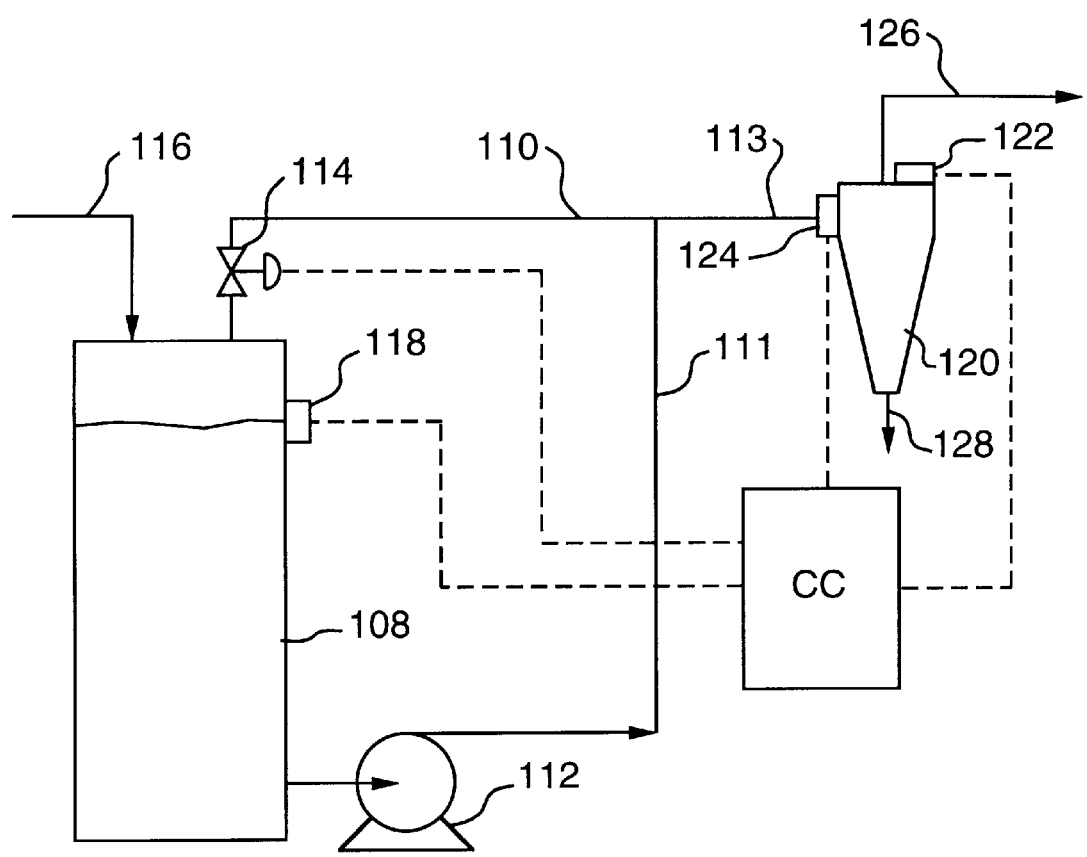
FIG. 6 is a block diagram and functional schematic representation of the details of a bank of liquid-solid separators connected to a fluid tank having a recirculation line with an in-line control valve connected to a control apparatus.

Another embodiment is illustrated in FIG. 6. This method of control is for the use of in-line pumps that have a set discharge rate. This embodiment may be adapted to any system of fluid tanks connected to liquid solid separators. Because the rate of fluid entering into tank 108 (FIG. 6) could vary, a recirculation line 110 can be placed on line 11 after the discharge of the in-line pump 112 with a control valve 114 that receives a signal from coordination controller CC. In-line pump 112 is located on line 111 which is connected to recirculation line 110 and liquid-solid separator inlet line 113.

Stream 116 enters tank 108 at a varying fluid flow. Due to the entering fluid flow varying and in-line pump 112 having a fixed discharge rate, the level in tank 108 will vary. To ensure control of level in tank 108 for steady process control, the following actions will be taken:

At system start-up, a predetermined number of hydroclones in a liquid-solid separator bank 120 are placed in service by the opening of inlet valves (not shown). Also control valve 114 is set to a predetermined position. Fluid level in tank 108 is established by fluid level sensors 118. In-line feed pump 112 is started and the inlet pressure at liquid solid separator bank 120 through lines 111 and 113 is established. Fluid flow to liquid solid separator bank 120 is allowed to achieve equilibrium. A steady state fluid flow will be achieved so that the desired liquid-solid separator bank inlet pressure can be achieved and maintained. Liquid-solid separator bank 120 has an overflow line 126 and an underflow line 128.

After the system has achieved steady state, control valve 114 is set to automatic. An inlet pressure setpoint for the fluid entering liquid-solid separator is established. It may be established automatically after which the setpoint information is sent to coordination controller CC. Alternatively, a setpoint may be predetermined and programmed into coordination controller CC. The pressure setpoint is the desired fluid inlet pressure for liquid-solid separator bank 120.

Similarly, fluid level setpoint range for the fluid level in tank 108 is also established. It may be established automatically after which the setpoint information is sent to coordination controller cC. Alternatively the setpoint range may be predetermined and programmed into coordination controller CC. The setpoint range includes a high level setpoint and a low-level setpoint.

Again referring to FIG. 6 the control for liquid-solid separator bank 120 is set to automatic. When the fluid level in tank 108 rises above the high level setpoint, the coordination controller CC computes and generates an output signal to liquid solid separator controller 122 to place in service one or more automated hydroclones (not shown) by the opening of an inlet valve (not shown). This additional hydroclone or hydroclones reduces the total fluid inlet pressure to liquid-solid separator bank 120. If coordination controller CC receives an input signal lower than the desired pressure setpoint from the pressure sensors 124 the coordination controller CC subsequently computes and generates an output signal to close control valve 114 on recirculation line 110 until the desired pressure at inlet sensor 124 is achieved. As control valve 114 closes, the gpm of fluid flow to liquid-solid separator bank 120 increases. This increase in fluid flow now starts to drop the fluid level in tank 108.

When the fluid level in tank 108 drops below the low level setpoint, the coordination controller CC computes and generates an output signal to liquid-solid separator controller 122 to close one or more automated hydroclones in the liquid-solid separator bank 120. As a result, the fluid inlet pressure at inlet pressure sensor 124 increases. Coordination controller CC receives this information and accordingly opens control valve 114 on the recirculation line 110 to adjust the pressure. Subsequently, the fluid level in the tank 108 rises again if the fluid input is greater than fluid discharge.

Figure 7:
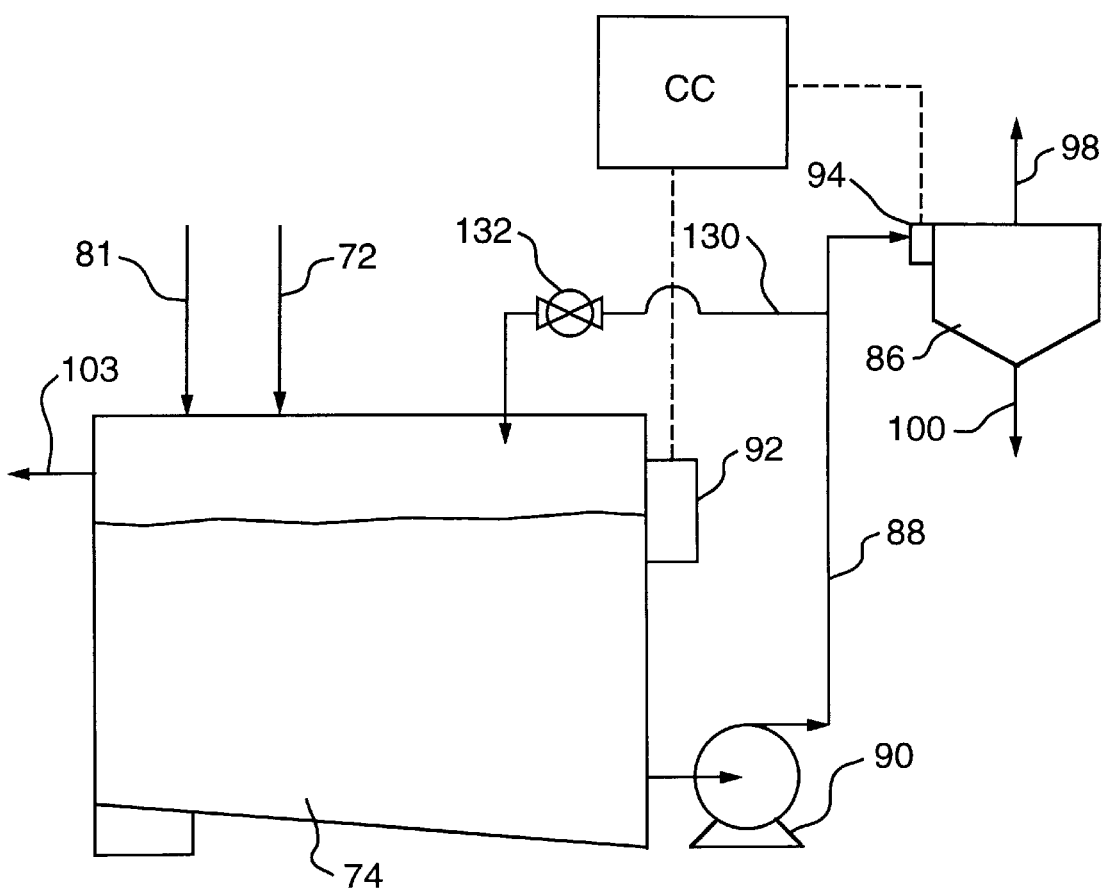
FIG. 7 is a block diagram and functional schematic representation of the details of the dilution tank of FIG. 5 having a recirculation line with an in-line control valve connected to a control apparatus.

FIG. 7 shows the above control valve embodiment adapted for use on dilution tank 74 of FIGS. 5 and 1. FIG. 7 shows dilution tank 74 having a recirculation line 130 with a control valve 132. The advantages and operation of this system are the same as described generally for the embodiment in FIG. 6.

While there has been illustrated and described several embodiments of the present invention, it will be apparent that various changes and modifications thereof will occur to those skilled in the art. It is intended in the appended claims to cover all such changes and modifications that fall within the true spirit and scope of the present invention.

What is claimed is:

1. A method for simultaneously controlling and coordinating a plurality of liquid-solid separators in a common bank, a fluid feed tank and an in-line pump in response to a fluid moving outside a predetermined setpoint level limit in said fluid tank, whereby the fluid is discharged from said fluid feed tank through said in-line pump and into said common bank of liquid-solid separators, the method comprising:

obtaining and reporting data from sensors in said fluid feed tank, reporting the actual level of fluid or change in fluid level in said fluid feed tank;

computing a first value derived from said sensor data and a first predetermined setpoint variable, wherein said first setpoint variable is a fluid level limit variable;

generating a first command signal from a coordination controller based on said first computed value, wherein said first command signal adjusts the number of separators in operation as a function of the level of the fluid in said fluid tank;

obtaining and reporting data from fluid pressure sensors at an inlet of said common bank of liquid-solid separators reporting the actual fluid pressure or change in fluid pressure at said inlet;

computing a second value derived from said pressure sensor data and a second predetermined setpoint variable, wherein said second setpoint variable is a fluid pressure limit variable; and simultaneously or immediately after generating said first command signal, generating a second command signal from said coordination controller based on said second computed value, wherein said second command signal adjusts the speed of said in-line pump as a function of the pressure of the fluid at said inlet of said common bank of liquid-solid separators;

such that a system having a fluid feed tank coordinated with plurality of liquid-solid separators in a common bank can operate continuously and at steady state.

2. The method according to claim 1, wherein fluid level and fluid pressure setpoints are established automatically after fluid level and fluid pressure information is obtained and reported to said coordination controller after start-up.

3. The method according to claim 1, wherein fluid level and fluid pressure setpoints are predetermined and programmed in to said coordination controller.

4. The method according to claim 1, wherein data is obtained and reported from sensors by signals selected from the group consisting of electronic, digital and pneumatic signals.

5. The method according to claim 1, wherein command signals are sent and received by signals selected from the group consisting of electronic, digital and pneumatic signals.

* * * * *